March 25, 1952

J. M. HAIT 2,590,174

DRIVEN DIRIGIBLE DUAL FRONT
WHEEL UNIT FOR TRACTORS

Filed Jan. 27, 1947

INVENTOR
JAMES M. HAIT

BY Philip J. Minnis.
Hans G. Hoffmeister.

ATTORNEYS

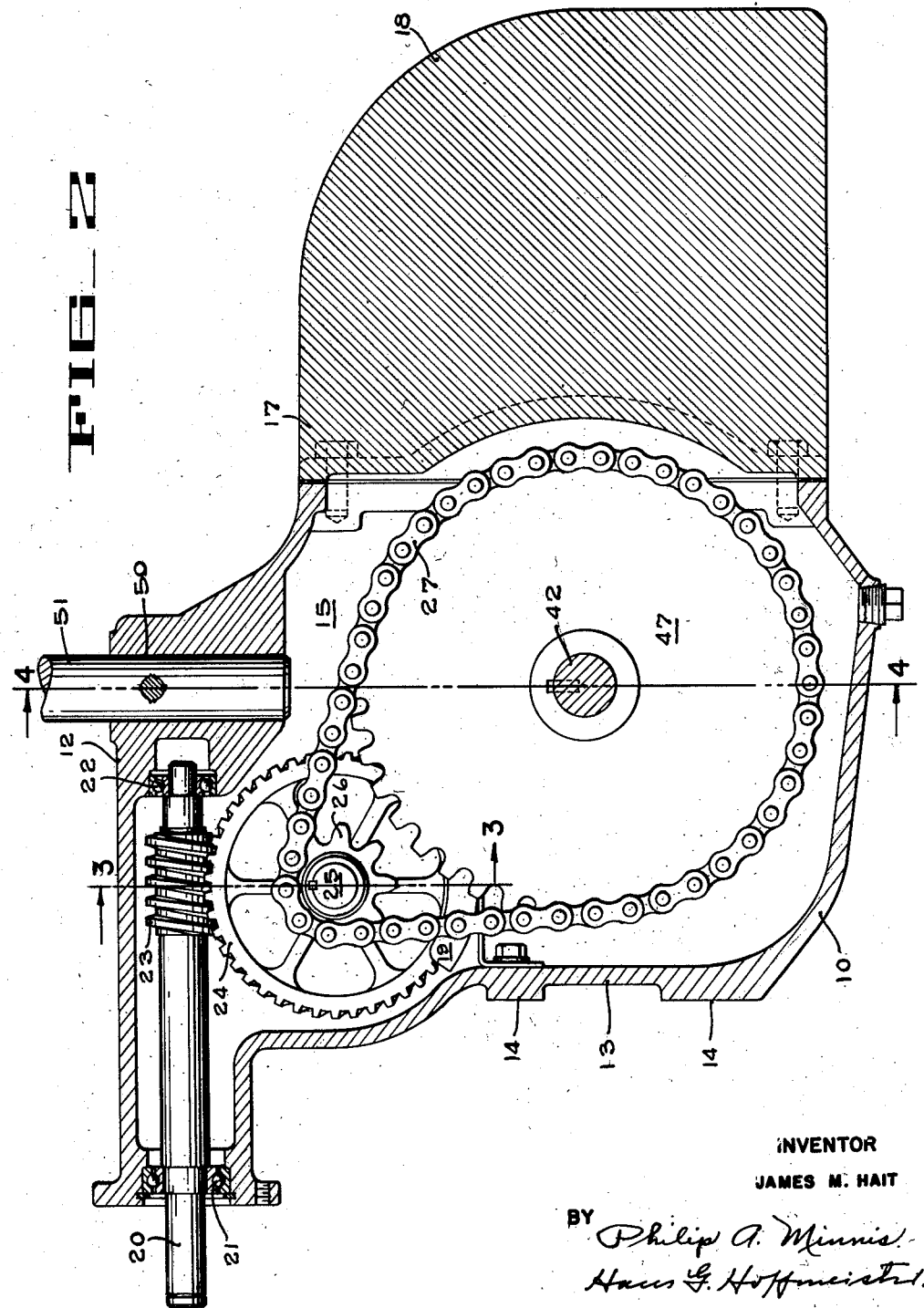

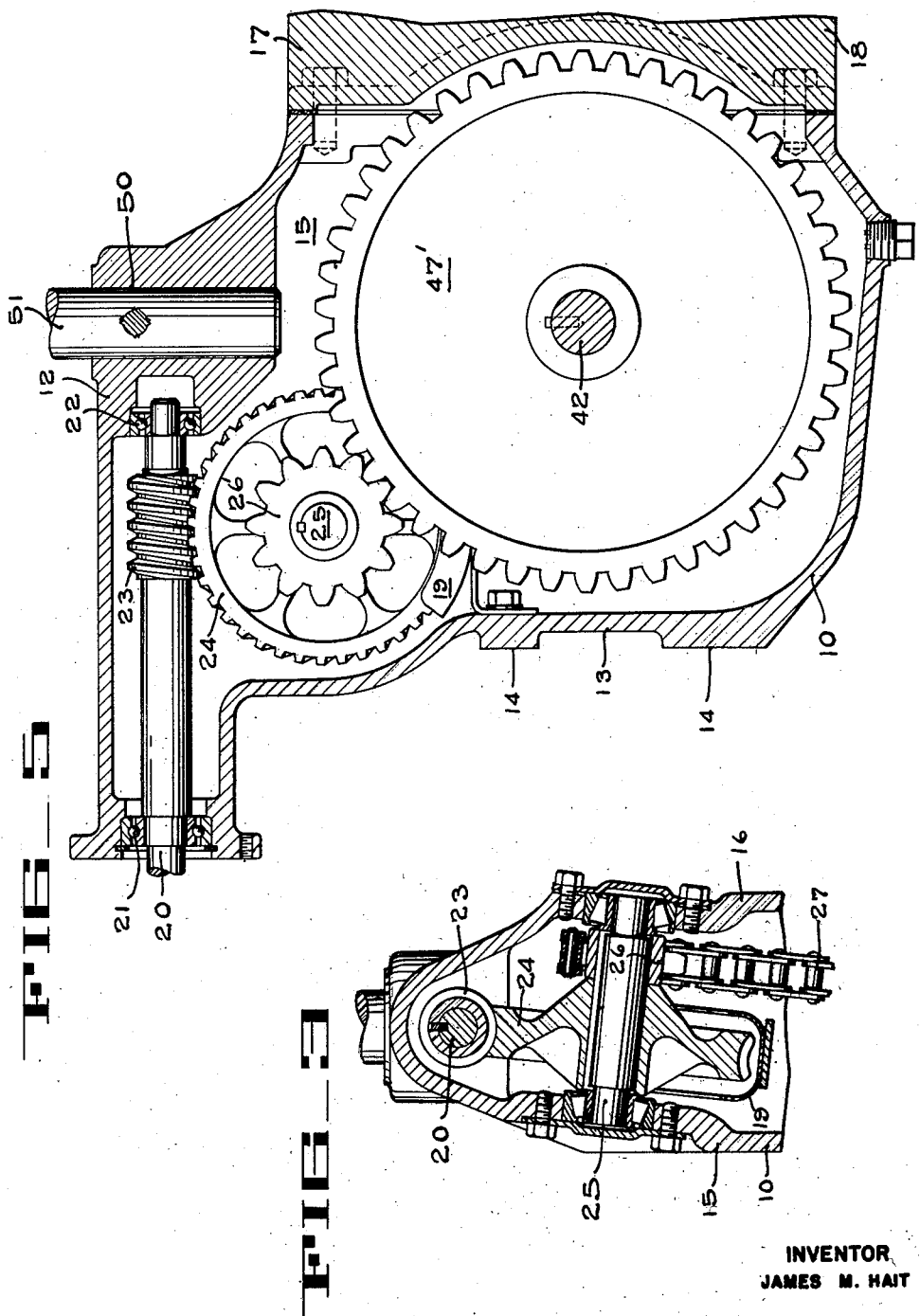

Patented Mar. 25, 1952

2,590,174

UNITED STATES PATENT OFFICE 2,590,174

DRIVEN DIRIGIBLE DUAL FRONT WHEEL
UNIT FOR TRACTORS

James M. Hait, San Jose, Calif., assignor to Food
Machinery and Chemical Corporation, a corporation of Delaware Application January 27, 1947, Serial No. 724,688

10 Claims. (Cl. 180—42)

The present invention relates to transmission arrangements of the type adapted to deliver the power of a drive or propeller shaft to a plurality of axles disposed transversely thereto. More particularly the present invention relates to transmission arrangements adapted to deliver the power of a drive or propeller shaft to a plurality of transverse axles that are inclined relative to one another.

The transmission of the present invention is especially adapted for use in certain types of automotive vehicles, such as agricultural tractors which are provided with what are termed "cambered" traction wheels; that is to say, with wheels which operate in converging planes with their lower portions closely adjacent to one another to render differential gearing unnecessary and increase the maneuverability of the vehicle.

One object of the present invention is to provide a simple and sturdy transmission arrangement of the type referred to, which is efficient in operation and compact in construction.

Another object is to provide a transmission arrangement adapted to deliver the power of a drive or propeller shaft to a plurality of inclined axles within a minimum of space laterally of the propeller shaft.

Another object is to provide a power transmission arrangement adapted to deliver the power of a longitudinally disposed drive or propeller shaft to a plurality of traction wheels tilted with respect to each other and positioned at either side of the propeller shaft.

Another object is to provide a transmission arrangement of the type referred to which permits such close mounting of two oppositely tilted traction wheels on either side of the propeller shaft as to render differential gearing unnecessary.

Another object is to provide a simple and inexpensive transmission arrangement for a pair of cambered traction wheels for agricultural tractors, or the like, which permits the wheels to be mounted at such angles and so close relative to one another as to establish contiguity of their lower segments.

Another object is to provide a compact transmission arrangement of the type referred to, which is adapted to yield a substantial reduction in the speed applied to the cambered traction wheels as compared with the speed originally imparted to the drive or propeller shaft from a motor or engine.

Another object is to provide a power transmission system of the type referred to wherein the drive or propeller shaft transmitting the power of an engine or motor to the cambered wheels is disposed sufficiently high with respect to the wheels to provide adequate ground clearance for operation over rugged fields, brushland, and the like.

Other and further objects and advantages of the present invention will become apparent from the following description and accompanying drawings which illustrate certain preferred embodiments of the invention as applied to agricultural tractors, and wherein:

Fig. 2 is a longitudinal section through the transmission shown in Fig. 1 taken along line 2—2 thereof, certain parts being omitted.

Fig. 3 is a cross-sectional view of the transmission taken along line 3—3 of Fig. 2.

Fig. 5 is a longitudinal section, similar to Fig. 2, of a modified embodiment of the invention.

The transmission arrangement of the present invention (Figs. 1 to 4) is housed in a suitable casing 10 of cast steel or any other appropriate material. A horizontally disposed drive or propeller shaft 20 (Fig. 2) protrudes into the upper portion of the casing 10.

A suitable bearing 21 provided in the extreme forward portion of the casing 10 and a second bearing 22 located near the center of the casing 10 rotatably support the propeller shaft 20.

Figure 1:
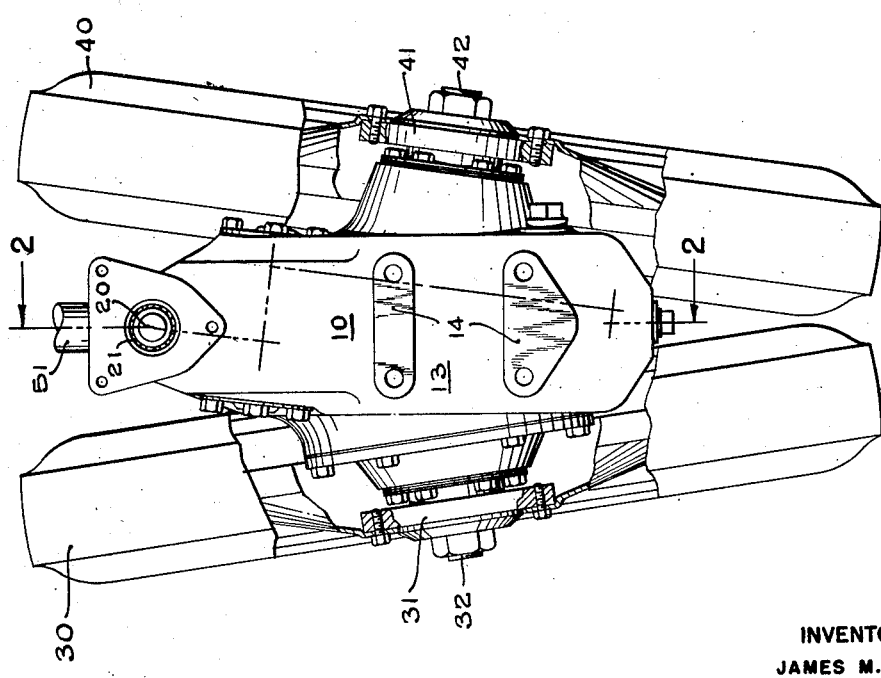
Fig. 1 is a front elevation of the transmission of the present invention in conjunction with oppositely tilted traction wheels at either side thereof.

The propeller shaft 20 may be driven from any suitable source of power such as a motor (not shown) supported from mounting pads 14 provided in the front wall 13 of the transmission casing 10, as shown in Figs. 1 and 2.

A worm 23 (Figs. 2 and 3) is keyed upon the propeller shaft 20 near its interior end and disposed below and in mesh with said worm 23 is a worm gear 24 keyed upon an inclined stub shaft 25 extending transversely to the propeller shaft 20 and suitably journalled in the side walls 15 and 16 of the casing 10 (Fig. 3). For proper adjustment of the assembled transmission structure the bearings of the stub shaft 25 may be of the adjustable type as shown.

Figure 4:
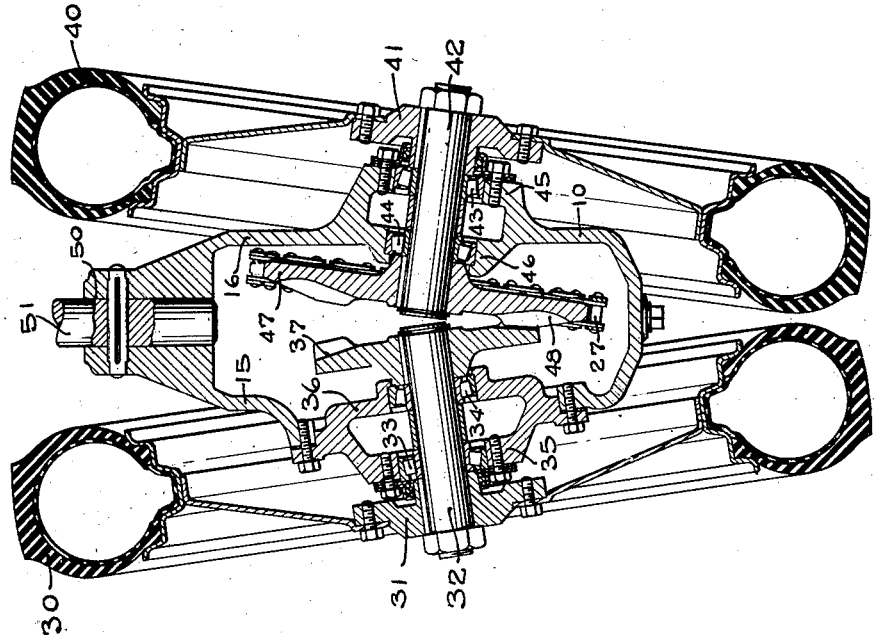
Fig. 4 is a transverse section of Fig. 1.

As may best be seen from Fig. 4, the tilted traction wheels 30 and 40 of the tractor are mounted on hubs 31 and 41, respectively, which are keyed on oppositely inclined axles 32 and 42. The left axle 32 (as viewed in Fig. 4) is journalled in suitable bearings 33 and 34 provided in bifurcate sections 35 and 36 of the side wall 15 of the transmission casing 10, and similarly the right axle 42 is journalled in suitable bearings 43 and 44 provided in bifurcate sections 45 and 46 of the opposite side wall 16.

The axles 32 and 42 terminate just short of contact interiorly of the transmission casing 10, as shown in Fig. 4, and keyed upon the interior end of the axle 42 is a sprocket 47 arranged to rotate in a tilted plane parallel to the plane of rotation of the right traction wheel 40.

Reverting to Fig. 3, the stub shaft 25 in the upper portion of the transmission casing 10 is of such an inclined position as to be parallel with the right hand axle 42, and keyed upon the downwardly inclined end of the stub shaft 25 for rotation in unison with the worm gear 24 is a sprocket 26. The tilted sprocket 26 in the upper portion of the transmission casing 10 and the tilted sprocket 47 in the lower portion of the transmission casing are so positioned on their respective shafts as to lie in a common slanting plane which is parallel to the plane of rotation of the right hand traction wheel 40 (Figs. 3 and 4). A sprocket chain 27 operatively connects the sprockets 26 and 47, as shown in Fig. 2.

The interior end of the left-hand axle 32 carries a bevel gear 37 which is keyed on said axle for rotation therewith. This bevel gear 37 is so positioned with respect to sprocket 47 that the teeth in its lower portion engage teeth 48 of like number and configuration provided in the inwardly directed face of the element 47 which has previously been termed a sprocket but is in fact a structure combining the characteristics of both a sprocket and a bevel gear.

The described transmission arrangement operates in the following manner: The worm 23 converts rotary movement of the propeller shaft 20 in a vertical plane of rotation transversely to the tractor assembly, into rotary movement of the worm gear 24 within a tilted plane parallel to the plane of rotation of one of the traction wheels, namely traction wheel 40. The worm gear 24 rotates the shaft 25 and the upper sprocket 26 keyed on the downwardly inclined stub thereof and the sprocket 25 in turn drives the lower sprocket 47 through the chain 27 which is trained around the two sprockets and extends in their common plane of rotation. The sprocket 47 turns the axle 42 and thus operates the tilted traction wheel 40 at the right hand side of the transmission casing 10. At the same time the bevel gear part 48 of the element 47 drives the bevel gear 37 and, consequently, turns the axle 32 and hence the traction wheel 30 on the left hand side of the tractor assembly in the same direction and at the same speed as the traction wheel 40.

Thus, the structure resulting from the above described arrangement permits two oppositely tilted traction wheels to be driven from a common propeller shaft placed at a relatively high level for reasons of adequate ground clearance, through a minimum of intermediaries and within a space of very small compass laterally of the assembly. As a result thereof, the traction wheels may be mounted so closely together that their lowermost segments will be contiguous so that a tractor embodying my invention will not require any differential gearings; and since the disclosed arrangement permits the traction wheels to be tilted at very considerable angles, if so desired, contiguity of their lower segments may be achieved even if wheels of relatively small diameters are employed.

The described arrangement also permits of a material reduction of the operational speed imparted to the propeller shaft from a motor or engine before it is applied to the traction wheel axles 32 and 42, with corresponding increase in traction, because the location of stub shaft 25 above and forwardly of the axles 32 and 42 permits both the worm gear 24 and the lower sprocket 47 to be made of relatively large diameters within the limited space available vertically of the tractor arrangement without interference. In addition, the described location of the stub shaft 25 with the gear 24 and the upper sprocket 26 mounted thereon and of the combined sprocket 47 and bevel gear with its associated bevel gear 37 in the lower portion of the casing provides space for mounting a steering trunnion 51 into a suitable cavity 50 formed in the top wall 12 of the transmission casing 10 directly behind the propeller shaft 20 and substantially within a vertical plane containing the traction wheel axles 32 and 42. Pivotal connection of the tractor assembly to the main frame of the vehicle (not shown) at the place indicated affords maximum maneuverability with a minimum of steering effort.

In spite of the narrow lateral compass of the transmission arrangement described, lubrication of the mechanism is simple and effective. For this purpose the lower portion of the transmission casing 10 is filled with lubricating oil to a level covering the contacting areas of bevel gear 37 and sprocket 47. The action of the sprocket chain 27 as it dips into, and emerges from, the oil bath will splash considerable amounts of oil into the upper portion of the transmission casing and thus supply adequate lubrication for the bearings of the axles 32 and 42 and also for the upper sprocket 26 and the bearings of the stub shaft 25. In addition, oil carried upwards by the links of the sprocket chain 27 will be squeezed off by the teeth of the upper sprocket 26 as they engage the chain, and will flow down the conical surface of the adjacent worm gear 24 and drip into an arcuate oil pan 19 provided below and closely adjacent to the worm gear 24. Oil pan 19 may be suitably supported from the front wall 13 of the transmission casing 10 by a bracket, such as shown in Fig. 2. As the transmission commences to operate, the chain will soon fill the pan 19 with oil and thus provide proper lubrication for the worm transmission.

In the illustrated embodiment the transmission casing is cast in a single piece except for its rear wall which is formed by a detachable lid 17 suitably bolted in place, as shown in Fig. 2. Lid 17 may be provided with a rearward extension 18 of heavy material to provide a counterweight for the engine mounted in front of the assembly, as previously indicated.

Fig. 5 shows a modified embodiment of the invention which agrees in most respects with the arrangement as illustrated in Figs. 2, 3, and 4, except that a spur gear 26′ keyed upon the inclined stub shaft 25 takes the place of the upper sprocket 26. Spur gear 26′ meshes with another spur gear 47′ which is keyed on the inclined axle 42 of the traction wheel 40 and takes the place of the previously described sprocket 47. The spur gear 47′ has its inner face formed into a bevel gear (not shown) in the same manner as disclosed in connection with the sprocket 47 which meshes with the bevel gear 37 mounted on the interior end of the other axle 32.

It will be understood that the invention is subject to both variation and modification from the preferred form illustrated and that its scope should be judged only by the scope of the appended claims.

Having thus described my invention, what I claim as new and desire to protect by Letters Patent is:

1. Arrangement for simultaneously driving a pair of cambered traction wheels, including a first axle having an inner and an outer end, a sprocket mounted on the inner end of said axle for rotation therewith, said sprocket having radial gear teeth provided on its inner face, a second axle having an inner and an outer end and angularly disposed relatively to said first axle with its inner end adjacent to the inner end of said first axle, a bevel gear mounted on the inner end of said second axle for rotation therewith and in mesh with the radial gear teeth on the inner face of said sprocket, drive means engaging the cogs of said sprocket, and traction wheels firmly mounted on the outer ends of said axles.

2. A power transmission arrangement for automotive vehicles including a first and second wheel mounted for rotation in oppositely tilted planes such that their upper segments diverge from each other, gearing arranged to couple said wheels for movement in unison, a drive shaft protruding into the space between the said diverging upper segments of said wheels, a worm mounted on said drive shaft, a worm gear disposed within a plane parallel to the plane of said first wheel and in mesh with said worm, and means operating in a plane intermediate of said parallel planes for transmitting power from said worm gear to said first wheel.

3. A power transmission arrangement for automotive vehicles, including angularly disposed first and second axles having their inner ends arranged adjacent to one another, gears mounted on said inner ends and arranged to couple said axles for synchronous movement, first and second traction wheels mounted on said first and second axles respectively for rotation in relatively tilted planes such that their upper segments diverge from each other, a longitudinal drive shaft protruding into the space between the said diverging upper segments of said traction wheels, a worm firmly mounted on said drive shaft, a second shaft disposed transversely to said drive shaft and parallel to said first axle, a worm gear mounted on said transverse shaft in mesh with said worm for rotation in a plane parallel to the plane of said first traction wheel, and means operating in a plane intermediate of, and parallel to, said parallel planes for transmitting power from said worm gear to said first axle.

4. A power transmission arrangement for automotive vehicles including obliquely ascending first and second axles disposed to have their upper ends adjacent to one another, gears mounted upon said adjacent ends and arranged to couple said axles for synchronous rotary movement, first and second traction wheels mounted on said first and second axles respectively for rotation in downwardly converging planes such that their upper segments diverge from each other, a horizontally disposed drive shaft protruding into the space between said diverging upper segments of said traction wheels, a worm firmly mounted on said drive shaft, a second shaft disposed transversely below said worm and parallel to said first axle, a worm gear mounted on said transverse shaft in mesh with said worm; a first sprocket mounted on the downwardly inclined end of said transverse shaft for movement in unison with said worm gear and within an inclined plane parallel to the plane of said first traction wheel, a second sprocket mounted on said first axle near the inner end thereof for rotation within the same plane as said first sprocket, and a sprocket chain operatively connecting said sprockets.

5. Arrangement according to claim 4 having an arcuate oil pan disposed below and closely adjacent to said worm gear.

6. A power transmission arrangement for automotive vehicles, including relatively inclined first and second axles disposed to have their upper ends adjacent to one another, first and second traction wheels mounted on said first and second axles respectively for rotation in downwardly converging planes, a horizontally disposed drive shaft protruding into the space between the upper segments of said traction wheels, a worm firmly mounted on said drive shaft, a worm gear mounted below and in mesh with said worm for rotation within an inclined plane parallel to the plane of said first traction wheel, a first sprocket mounted adjacent to the downwardly inclined face of said worm gear and for rotation in unison therewith, a second sprocket mounted on the inner end of said first axle for rotation in the same inclined plane as said first sprocket and having radial teeth arranged in its inwardly directed face, a sprocket chain operatively connecting said sprockets, and a bevel gear arranged on the inner end of said second axle in mesh with the radial teeth in the inner face of said second sprocket.

7. A power transmission arrangement for automotive vehicles, especially agricultural tractors, including relatively inclined first and second axles disposed in a common vertical plane with their higher ends arranged adjacent to one another, gears coupling said ends for synchronous rotation of said axles, a drive shaft disposed above said axles and extending perpendicularly to the vertical plane thereof, a worm firmly mounted on said drive shaft, a second shaft disposed below said worm and parallel to said first axle, a worm gear mounted on said second shaft in mesh with said worm for rotation within an inclined plane, a sprocket mounted on said second shaft adjacent to the downwardly inclined face of said worm gear and for rotation in unison therewith, a second sprocket mounted on the inner end of said first axle for rotation in the same plane as said first sprocket, a sprocket chain operatively connecting said sprockets, and traction wheels mounted on each of said axles with their lower segments contiguous with one another.

8. A power transmission arrangement for automotive vehicles, especially agricultural tractors, including relatively inclined first and second axles disposed in a common vertical plane and having their higher ends arranged adjacent to one another, a drive shaft disposed above said axles and extending perpendicularly to the vertical plane thereof, a worm firmly mounted on said drive shaft, a second shaft disposed below said worm and extending parallel to said first axle, a worm gear mounted on said second shaft in mesh with said worm for rotation within an inclined plane, a sprocket mounted on said second shaft adjacent to the downwardly inclined face of said worm gear and for rotation in unison therewith, a second sprocket mounted on the inner end of said first axle for rotation in the same inclined plane as said first sprocket and having radial teeth arranged in its inwardly directed face, a sprocket chain operatively connecting said sprockets, a bevel gear arranged on the inner end of said second axle and in mesh with the radial teeth of said second sprocket, and traction wheels mounted on each of said axles with their lower segments contiguous with one another.

9. A power transmission arrangement for automotive vehicles, especially agricultural tractors, including relatively inclined first and second axles disposed in a common vertical plane with their higher ends arranged adjacent to one another, gears coupling said ends for common rotary movement of said axles, a drive shaft disposed above said axles and extending perpendicularly to the vertical plane thereof, a worm firmly mounted on said drive shaft, a second shaft disposed below said worm and parallel to said first axle, a worm gear mounted on said second shaft in mesh with said worm for rotation within an inclined plane, a spur gear mounted on said second shaft adjacent to the downwardly inclined face of said worm gear and for rotation in unison therewith, a second spur gear mounted on the inner end of said first axle in the same plane as said first spur gear and in mesh therewith, and traction wheels mounted on each of said axles.

10. A power transmission arrangement for automotive vehicles, especially agricultural tractors, including relatively inclined first and second axles disposed in a common vertical plane and having their higher ends arranged adjacent to one another, a drive shaft disposed above said axles and extending perpendicularly to the vertical plane thereof, a worm firmly mounted on said drive shaft, a second shaft disposed below said worm and extending parallel to said first axle, a worm gear mounted on said second shaft in mesh with said worm for rotation within an inclined plane, a spur gear mounted on said second shaft adjacent to the downwardly inclined face of said worm gear and for rotation in unison therewith, a second spur gear mounted on the inner end of said first axle and in mesh with said first spur gear and having radial teeth arranged in its inwardly directed face, a bevel gear arranged on the inner end of said second axle and in mesh with the radial teeth in the face of said second spur gear, and traction wheels mounted on each of said axles with their lower segments contiguous with one another.

JAMES M. HAIT.

REFERENCES CITED

The following references are of record in the file of this patent:

UNITED STATES PATENTS

| Number | Name | Date |
|---|---|---|
| 325,270 | Pridmore | Sept. 1, 1885 |
| 1,310,542 | Pratt | July 22, 1919 |
| 1,670,471 | Merkt | May 22, 1928 |
| 2,015,218 | Dufour | Sept. 24, 1935 |
| 2,336,386 | Beck | Dec. 7, 1943 |
| 2,350,593 | Cunningham | June 6, 1944 |
| 2,398,498 | Funk | Apr. 16, 1946 |
| 2,457,821 | Johnson | Jan. 4, 1949 |